JOHN J. KNOWLTON.
Improvement in Turbine Water-Wheels.

No. 115,217.  Patented May 23, 1871.

Witnesses  
Edw. Griffith  
J. B. Blanchard

John J. Knowlton  
by his Attorney  
Frederick Curtis

UNITED STATES PATENT OFFICE.

JOHN J. KNOWLTON, OF SACCARAPPA, MAINE.

IMPROVEMENT IN TURBINE WATER-WHEELS.

Specification forming part of Letters Patent No. 115,217, dated May 23, 1871.

*To all to whom these presents shall come:*

Be it known that I, JOHN J. KNOWLTON, of Saccarappa, in the county of Cumberland and State of Maine, have made an invention of certain new and useful Improvements in Turbine Water-Wheels; and do hereby declare the following to be a full, clear, and exact description thereof, due reference being had to the accompanying drawing making part of this specification, and in which—

Figure 1:
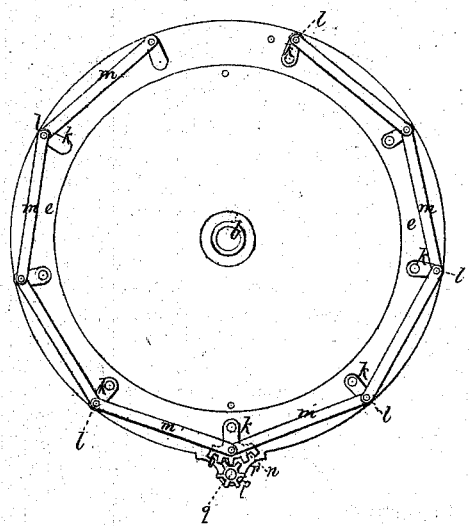
Figure 3:
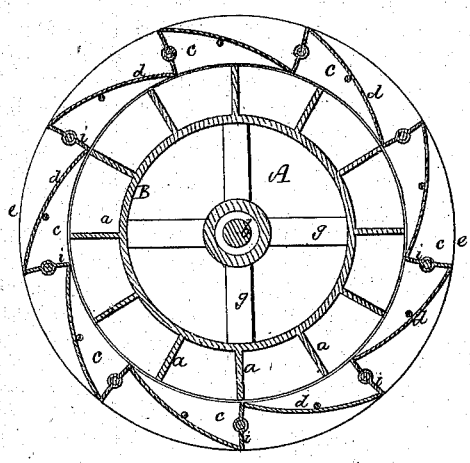
Figure 2:
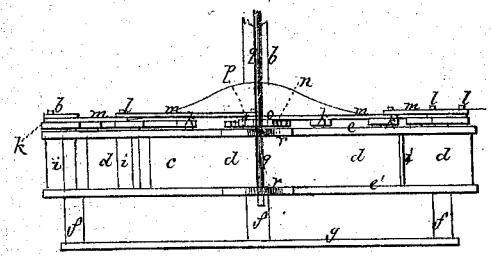

Figure 1 is a plan, Fig. 2 a side elevation, and Fig. 3 a horizontal section, of a horizontal water-wheel containing my said improvements.

Description of Construction.

The accompanying drawing represents, at A, the body of a horizontal turbine water-wheel, the same consisting of a short upright cylinder, B, to whose periphery a series of curved vanes, $a\ a$, &c., is attached, the top of the cylinder, as well as of each vane, being covered by a cap-plate, a vertical shaft, $b$, extending through the said cylinder and some distance above and below the same. The water-inlet ports or ducts are shown at $c\ c$ as arranged in a concentric circle about the periphery of the wheel A, and is composed of a series of upright curved tangential wings, $d\ d$, &c., whose opposite edges are confined between two dually-arranged annular plates, $e\ e'$, the lower of which is mounted upon posts $f f$, &c., erected upon two crossed bars, $g\ g$, as represented in the drawing. At the point of intersection of the bars $g\ g$ the pivot is placed which supports the shaft $b$, and upon which such shaft rotates.

The above description embodies the construction of a water-wheel substantially as now generally manufactured and used, with the exception of the curved wings $d\ d$, &c., which are usually straight.

In carrying my invention into practical effect I pivot between the two annular plates, and immediately in advance of each wing $d$, an upright plate or gate, $i$, the upper pivot of each gate passing through the upper cap or plate $e$, and being provided thereat with a crank, $k$, extending radially outward and terminating, preferably, at the circumference of such cap-plate. The wrist-pin $l$ of each crank is joined or pivoted to that of its neighbor by means of a rigid pitman, $m$, while one crank is enlarged into the form of a sectional plate, $n$, upon the outer edge of which a rack, $o$, is produced, into which a pinion, $p$, meshes, such pinion, in turn, being mounted upon an upright shaft, $q$, which is supported in bearings $r\ r$ extending laterally from the periphery of the cap-plate $e$. By turning the shaft and its pinion in either direction the entire series of gates will be forced in a like direction, and simultaneously open or close the range of inlet-ports, the cranks and pitmen forming a positive mechanical movement, which insures an unvarying and equable action of the gate. The pivot of each gate should be placed at about the center thereof, in order that an equipoise of the same by the inrushing water may occur, by which means the labor devolving upon the governor, which is attached to the upper extremity of the shaft $q$, is greatly lessened, and the functions of such governor performed in a regular and efficient manner.

Although I have stated that the pivot of each gate is disposed at about the center of the same, I prefer that it be placed slightly near the inner edge of the said gate in order that the inrushing fluid may tend to close rather than to open it.

It will be observed that each gate is closed horizontally to correspond to the curve of each wing or wall $d$, and I have found, in practice, that this curved form of wing delivers the water upon the wheel to great advantage.

Claim.

I claim—

In a water-wheel, substantially such as described, the combination of the curved wings or walls $d$, and the gates $i$, pivoted at about their centers and curved with relation to the wings $d$, as herein shown and set forth.

JOHN J. KNOWLTON.

Witnesses:
FRED. CURTIS,
E. GRIFFITH.